United States Patent [19]
Bonafous

[11] 3,991,974
[45] Nov. 16, 1976

[54] BUTTERFLY VALVE
[75] Inventor: Maurice Bonafous, Gurmencon, France
[73] Assignee: Applications Mecaniques et Robinetterie A.M.R.I., Paris, France
[22] Filed: Dec. 18, 1974
[21] Appl. No.: 534,355

[30] Foreign Application Priority Data
Dec. 19, 1973 France .............................. 73.45502

[52] U.S. Cl. ............................. 251/306; 251/171; 251/192; 251/214; 251/152
[51] Int. Cl.² .......................................... F16K 1/22
[58] Field of Search ........... 251/192, 305, 306, 307, 251/308, 214, 152, 170, 173, 315, 171

[56] References Cited
UNITED STATES PATENTS

| | | | |
|---|---|---|---|
| 3,341,170 | 9/1967 | Housworth.......................... | 251/170 |
| 3,376,015 | 4/1968 | Forsman et al. ..................... | 251/306 |
| 3,565,394 | 2/1971 | Smith.................................. | 251/306 |
| 3,778,028 | 12/1973 | Graves et al......................... | 251/306 |
| 3,784,157 | 5/1972 | Wenglar.............................. | 251/306 |
| 3,837,620 | 9/1974 | Malloy et al......................... | 251/306 |
| 3,917,689 | 6/1970 | Roos................................... | 251/306 |

FOREIGN PATENTS OR APPLICATIONS
1,459,171  10/1966  France................ 251/305

*Primary Examiner*—William R. Cline
*Assistant Examiner*—H. Jay Spiegel
*Attorney, Agent, or Firm*—Haseltine, Lake & Waters

[57] ABSTRACT

A butterfly valve comprising a body having an internal cylindrical bore with two radial co-axial passages diametrically opposed with respect to the bore and a butterfly including a spherical cap section and two co-axially projecting shafts rotatably mounted in the passages to provide pivotal movement of the butterfly in the body. An annular elastomeric seat member of U-shaped section covers the bore and the outer side faces of the body and the seat receives the shafts of the butterfly and includes at each of the passages a portion of spherical shape substantially complementary to that of the cap section of the butterfly. The seat has a cuff portion surrounding the associated shaft and a support which is independent of the seat bears against the base thereof. The support is constituted of an elastic material housed in an annular groove provided in the body and the support has cuffed portions surrounding the shafts and permanently compressing the spherical portions of the seat against the respective cap portions of the butterfly to assure sealing towards the exterior of the passages for the shafts and, in closed position of the butterfly, the continuity of the sealing upstream and downstream of the butterfly on the seat.

6 Claims, 5 Drawing Figures

BUTTERFLY VALVE

The invention relates to a butterfly valve, in particular but not exclusively for reactive and/or inactive liquids, such as chemical liquids and liquid food stuffs.

More precisely, the invention relates to a butterfly valve of this conventional type, whereof the butterfly, in the shape of a disc or lens, may close off the passage for the liquid by rotation through one quarter of a revolution, causing it to bear against an annular seat whose U-shaped cross-section covers the inside and sides of the valve body.

This annular seat must be both resilient to ensure the seal, inert with regard to reactive and/or inactive liquids and allow friction of the butterfly, on the one hand with a low coefficient of friction and on the other hand without permanent deformation or wear. Since a single material does not possess these contradictory properties, it has already been proposed to make this annular seat from an elastomer, for example of rubber, covered outside the U-shape, with a layer of quality polymer, for example Teflon. But these two materials differ necessarily and considerably on the one hand as regards their moduli of elasticity and, on the other hand, by the extent of their ranges of elasticity, such that their connection, generally by adhesives, constitutes a formidable technical problem which is difficult to resolve, in particular from the points of view of permanent deformation of the polymer and its flow during operation.

Consequently, it is an object of the invention to eliminate this problem and with it these disadvantages and drawbacks, by constructing said elastomer having a layer of polymer, in a new way.

Furthermore, in said conventional type of butterfly valve, the butterfly is mounted on a shaft passing through said seat at the top or at the top and bottom, pivoted at the top or at the top and bottom in the body and leaving space at the top for the actuation of the butterfly. In the presence of reactive and/or inactive liquids, it is necessary to ensure a seal at these points in order to prevent any possibility of these reactive and/or inactive liquids from coming into contact with the said pivot points.

Another object of the invention is also to satisfy this operating requirement.

Briefly, there is incorporated in the said conventional type of butterfly valve, according to the invention, a support of slight thickness of elastomeric material is housed against the base of the U of the seat made from elastomer, in an annular groove in the body which it fills exactly; this support is independent of the seat and the seat and support arrangement is given greater elasticity at the point where the closed butterfly bears, i.e. in the median plane of the base of the U.

It is thus achieved according to the invention, that the elastic deformations are localized in the very immediate vicinity of the support point of the butterfly in the closed position and are thus localized at the center of the seat and, on the other hand, due to slight resilient deformation, the slight thickness of the support ensures sufficient pressure on the seat for the seal. For a slight engagement of the butterfly on the seat, the deformation of the seat remains slight, thus within the range of elasticity of the elastomer of the seat, while having considerable compression of the elastomer, the percentage compression with respect to the thickness of the support thus causing considerable compression. On the other hand, since the support fills the annular groove of the seat exactly, it is immobilized, as well as the seat, by the sides of the U and by the base of the U on each side of the support.

According to a preferred embodiment of the invention, to produce said greater elasticity, the seat has a lesser thickness in the center of the base of the U.

As a non-limiting example, the elastomer of the support may be natural or synthetic rubber and the elastomer of the seat may be FEP, PFA, polytetrafluoroethylene or another fluorinated polymer having the necessary qualities.

According to another feature of the invention, at the points for the passage of the shafts, the butterfly comprises two spherical portions and the seal both upstream and downstream as well as externally is ensured at the points for the passage of the shafts, by a spherical shape of the seat compressed by the support against the spherical shape of the portions of the butterfly.

This assembly advantageously ensures continuity of form, flexibility, elasticity and rate of compression all around the butterfly.

According to one embodiment of the invention, the support and seat form a cuff turned back around the shaft, the butterfly thus having a diameter slightly greater than that of the cuff retained by the support, such that this larger diameter of the butterfly defines a general rate of resilient compression, thus a seal both upstream and downstream at the points for the passage of the shaft.

In this respect, it will be noted that the seal on the spherical portion of the butterfly is sufficient to prevent any leakage bypassing along the axis under normal operating conditions.

According to another embodiment of the invention, the valve also comprises a second system for sealing the points for the passage of the shaft, ensured by the co-operation around one or each of the two traversing parts of the shaft, of a gasket, for example made from graphitized polytetrafluoroethylene, compressed by a spring between a washer bearing against a shoulder of a bore of the body in the region of the upper side of the elastomeric support and a bearing for the pivoting of the shaft, said gasket bearing against a flange provided at the upper part of the cuff constituted by the seat and which projects inside said washer.

One embodiment of the invention will be described hereafter as a non-limiting example, with reference to the accompanying drawings in which:

FIG. 2 is a cross-section, of a valve according to said preferred embodiment of the invention;

Figure 1:
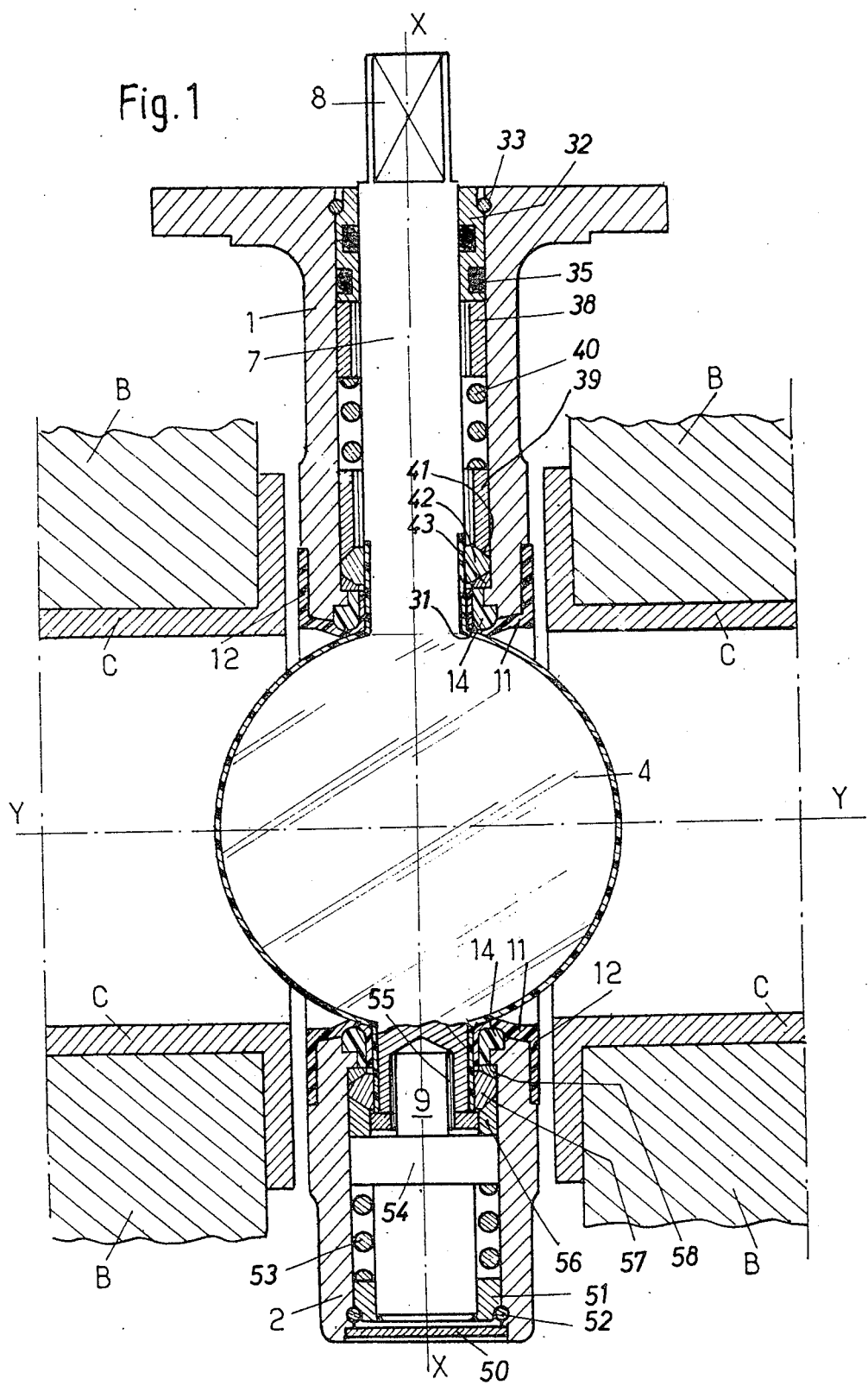
FIGS. 1 and 2 are two sections passing through the axis of the butterfly, the latter being in the open position, FIG. 1 being a longitudinal section
Figure 2:
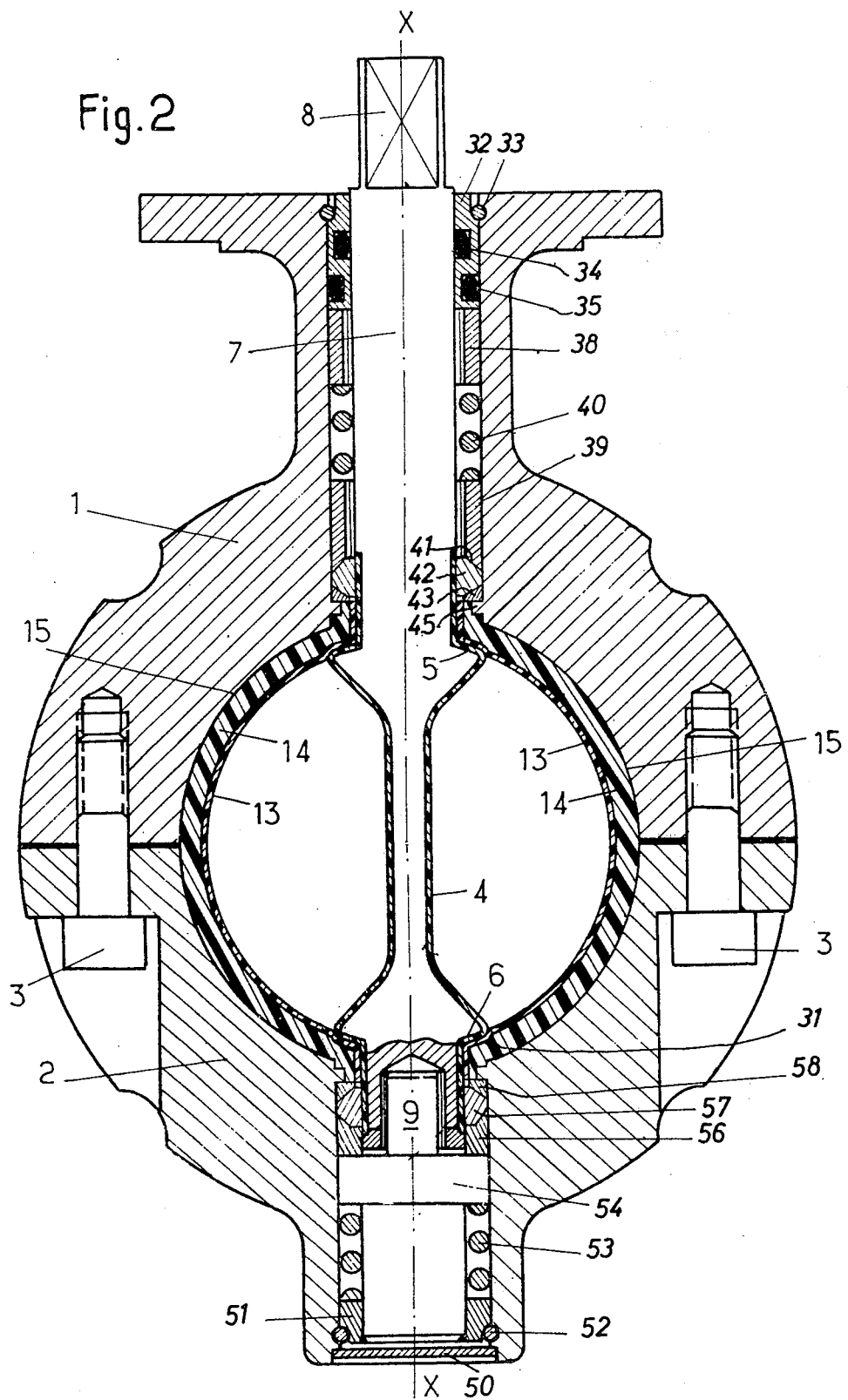

With reference to FIGS. 1 and 2: this valve comprises a body, in two parts 1 and 2 connected by screws 3, in which rotates a butterfly 4 in the shape of a disc or lens, with two spherical cap portions 5 and 6 at the points for the passage of the shaft whose axis is shown as X—X.

Preferably, the section of the disc constituting the butterfly is spherical cap and has the same diameter as said spherical portions.

Figure 4:
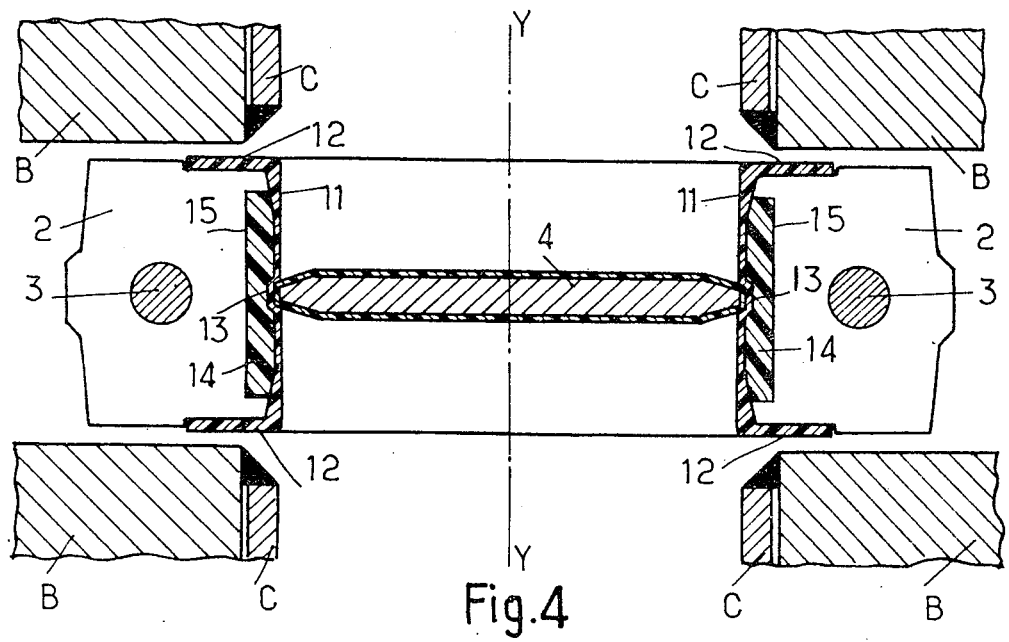
FIGS. 3 and 4 are two sections at right-angles to the axis of the butterfly and passing through the axis of the pipe, FIG. 3 in the open position of the butterfly and FIG. 4 in the closed position, and of the valve according to FIGS. 1 and 2.

The butterfly is made either from non-corrosive and inert metal, or, as shown, from painted or enamelled metal, or coated with elastomer or polymer, for example Teflon: the butterfly 4 is mounted on a shaft 7 emerging at 8 for the actuation of the valve and on a lower countershaft 9 (which is not present in valves of small diameter). The valve is mounted (FIG. 1) by flanges B between the sections of a pipe C. The flanges B may be welded to the pipe C, as shown in FIG. 4, the flanges B being able to be coated with a conventional protection material D, as shown in FIG. 3, as is the pipe C.

Figure 3:
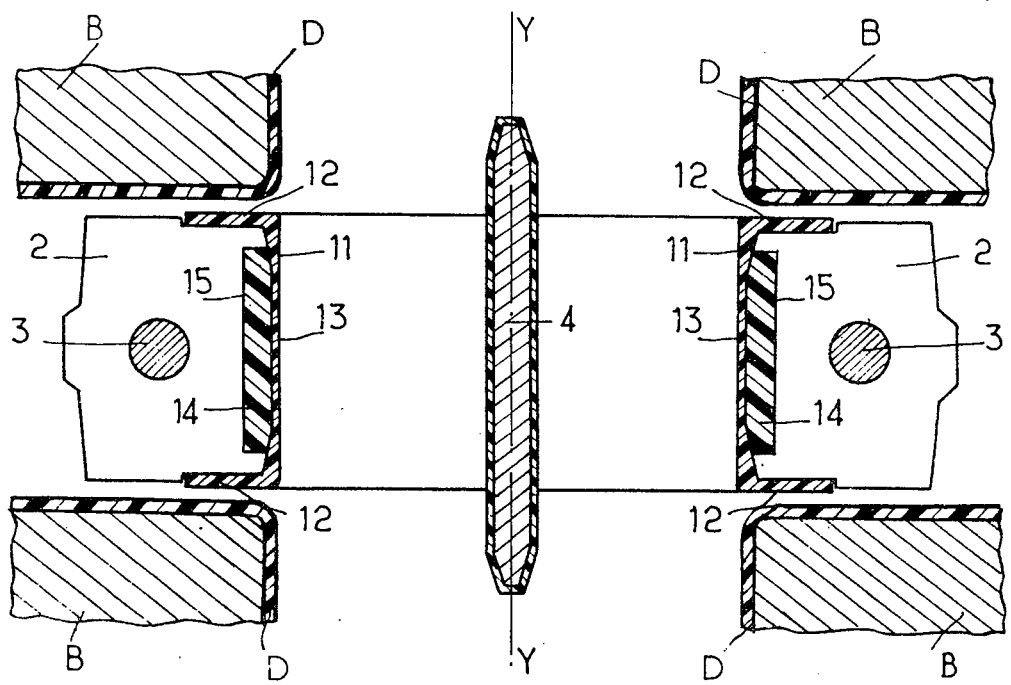

With reference to FIGS. 1 and 3, the seat 11 of the valve, made from an elastomer, is annular and of U-shaped section, the sides 12 of the U are clamped at the time of assembly by the flanges B (shown separated from the latter in FIG. 3 for the sake of clarity of the drawing) which ensures the seal of the member 1–2 while retaining the seat 11 firmly. In this preferred embodiment of the invention, the thickness of the base of the U of the seat 11 is less at the center 13 of the base of the U and a support 14, made from an elastomer, of slight thickness, exactly fills an annular groove 15 in the body 1–2.

It will be noted that the shape of the outer surface of the base of the U of the seat is preferably spherical. As shown in FIG. 4, in the closed position of the valve, the butterfly 4 deforms the center of the thin part 13 of the seat 11 only slightly, for which the slight thickness of the support 14 of elastomer nevertheless provides a reaction of the magnitude necessary for the seal. On the other hand, from FIG. 4, it is clear that the support 14 cannot escape from the groove 15 which it fills exactly and that the thick parts of the seat 11 of elastomer are not subject to flow and thus protect the thin central portion 13 therefrom, which portion they firmly retain.

Purely as an example, for a valve having a diameter of passage of 80mm, the thickness of the Teflon seat may be 1mm in the central part of the base of the U, 3mm. towards the edges of the base of the U and 2mm. on the sides of the U and the rubber support may have a thickness of 5mm.

Figure 5:
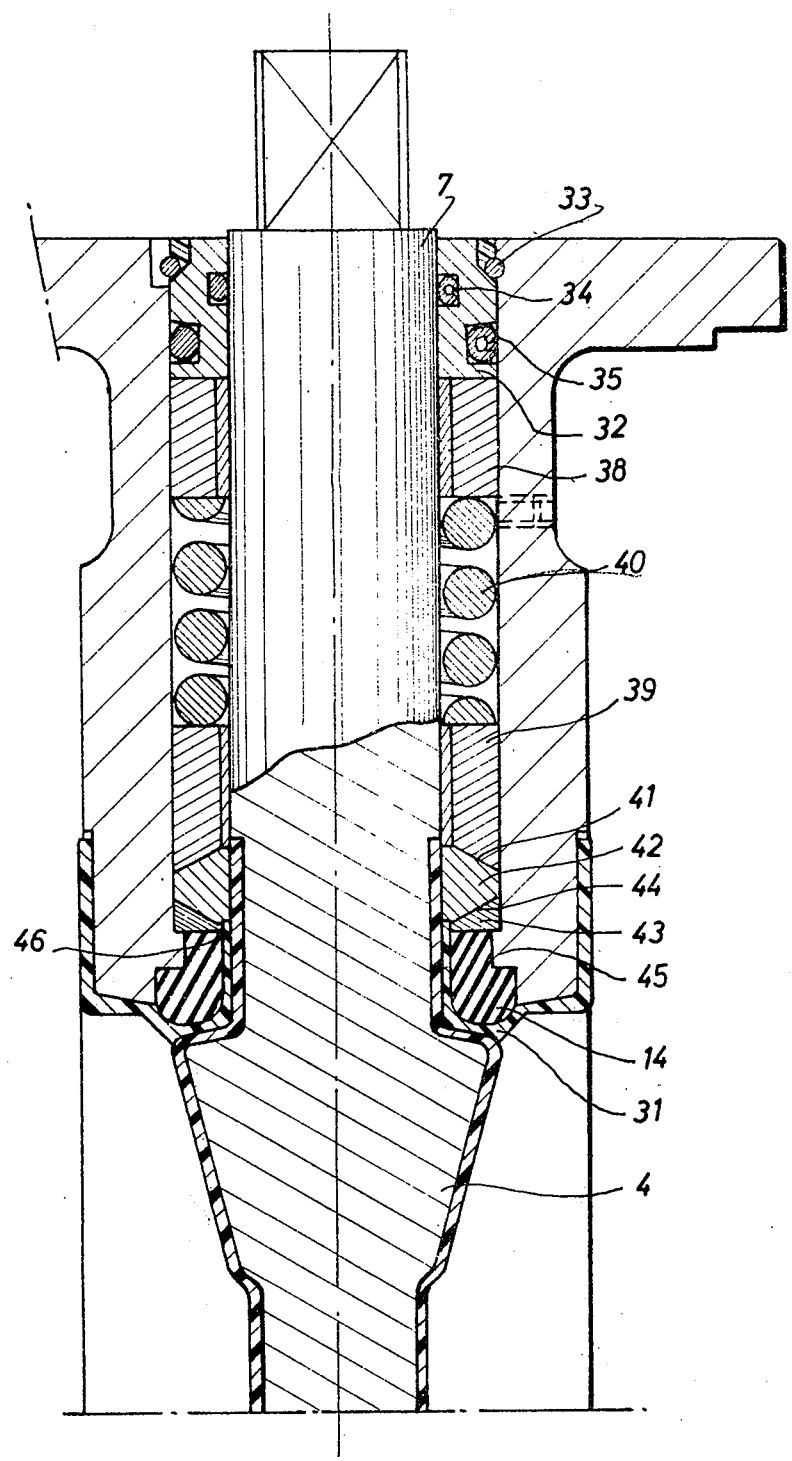
FIG. 5 is a partial longitudinal section on a larger scale, showing more clearly the two types of seals used in the valve according to FIGS. 1, 2, 3 and 4, namely the operating seal and the safety seal.

With reference to FIG. 5, the valve comprises two separate types of seal at the point for the passage of the shaft 7, namely, as afore-mentioned, an operating seal and a safety seal.

The operating seal which is applied both upstream and downstream as well as outside the valve is ensured at each of the points for the passage of the shaft 7 by a spherical shape 31 of the seat 11 compressed by the support 14 against the spherical shape of the corresponding portion 5, 6 of the butterfly 4. To this end, the support 14 and the seat 11 form a cuff turned back around the shaft 7.

In this respect, it will be noted that the diameter of the spherical shapes of the seat at the points for the passage of the shaft 7 may be advantageously equal to the diameter of the spherical shape of the outer surface of the base of the U of the seat. Furthermore, to retain the same elasticity, the thicknesses of the seat are identical.

The butterfly 4 thus has a diameter slightly greater than that of the cuff of the seat 11 retained by the support 14 such that this larger diameter of the butterfly 4 defines a general rate of elastic compression, thus providing a seal both upstream and downstream at the points for the passage of the shaft 7. This sealing method is sufficient to prevent any leakage through the passage of the shaft 7 under normal operating conditions and advantageously ensures continuity of shape, flexibility, elasticity and rate of compression all around the butterfly 4.

The safety seal along the shaft 7 is ensured by a device comprising a ring 32, for example of bronze, retained by a keeper 33 and provided with two gaskets, an inner gasket 34 and an outer gasket 35. Pivoting of the shaft 7 is ensured by two bearings 38, 39, between which a compression spring 40 acts. The second bearing 39 acts by way of its lower chamfered end 41 against an annular member having a triangular profile 42, for example, of polytetrafluoroethylene containing graphite serving as a gasket. This annular member 42 is retained by a washer 43, for example of stainless steel, having a chamfered side 44, which is retained by a shoulder of the bore 45 of the body located in the region of the upper side of the cuff formed by the support 14.

The safety seal is thus essentially ensured by the annular member 42 (or gasket) which, compressed between the bearing 39 and the washer 43 by means of the spring 40, comes into abutment with the section of a flange 46 provided on the upper part of the cuff formed by the seat 11. To this end, this flange 46 of the seat projects beyond the upper part of the cuff formed by the support 14 and projects slightly above the washer 43. The action of the annular member 42 on the flange 46 thus constitutes a sealing barrier preventing any leakage towards the outside in the case where the spherical seal is imperfect or is destroyed for any reason.

It should be noted that the compression rate of the annular member 42 is clearly greater than the compression of the elastomer support 14, such that the washer 43 always bears on the shoulder of the bore 45 of the body. Furthermore, the support 14 is locked in a finite space and the two said types of seal are thus absolutely independent of each other.

In the example shown in FIGS. 1 and 2, the lower part of the valve is closed by a metal stopper 50. A socket 51, retained by a keeper 52, supports a strong compression spring 53 bearing under a flange 54 of the countershaft 9 which supports the bearing 55 for the end of the shaft 7 of the butterfly 4. The flange 54 bears by way of a ring 56 in a similar manner to that afore-described, under a gasket 57 of graphitized Teflon, bearing under a washer 58 retained by a shoulder of the bore of the body, this gasket in turn coming into abutment with the section of a flange provided in the lower part of the cuff formed by the seat 11.

I claim:

1. A butterfly valve comprising a body having an internal cylindrical bore with two radial coaxial passages diametrically opposed with respect to said bore, a butterfly including a spherical cap section and two coaxially projecting shafts rotatably mounted in said passages and providing pivotal movement of said butterfly in said body between opened and closed positions, an annular elastomeric seat of U-shaped section covering the bore and the outer side faces of said body, said seat receiving the shafts of the butterfly and including at each of said passages a portion of spherical shape substantially complementary to that of the cap section of the butterfly and a cuff portion surrounding the associated shaft, a support independent of the seat and constituted of an elastomeric material housed in an annular groove provided in said body which the support completely fills, said support having a free surface in contact with the base of the U-shaped section of the seat, said support comprising a cuff portion surrounding each said shaft and bearing against the cuff portion of the associated seat and permanently compressing the spherical portions of the seat against the respective cap portions of the butterfly to assume both sealing towards the exterior of the passages for the shafts and, in closed position of the butterfly, the continuity of the sealing, upstream and downstream, of the butterfly on the seat, said valve further comprising around each of said shafts, an annular element of triangular cross-section, a bearing for said shaft having a tapered face in contact with one of the faces of said annular element, a washer having a tapered face in contact with the other face of said annular element, spring means acting on said bearing to urge the same against said annular element, said body having a shoulder against which said washer bears under the action of said spring means transmitted through the annular element, said shoulder being at the level of the upper face of the cuff portion of the support, said cuff portion of said seat extending into sealing contact with said annular member to form a second seat thereat.

2. A valve as claimed in claim 1 wherein said annular member has a greater compression rate than said support.

3. A valve as claimed in claim 1 wherein said cuff portion of said support has an outer bearing surface of rounded section in contact with said seat.

4. A valve as claimed in claim 1 comprising resilient means acting on said support for urging the support against said seat thereby to compress the spherical portions of the seat against the respective cap portions of the butterfly.

5. A valve as claimed in claim 4 wherein said resilient means includes bearing means acting on said support at the end face of said cuff portion thereof.

6. A valve as claimed in claim 5 wherein said cuff portion of the seat has an outer end which is engaged in sealing relation with said bearing means.

* * * * *